Patented Feb. 21, 1933

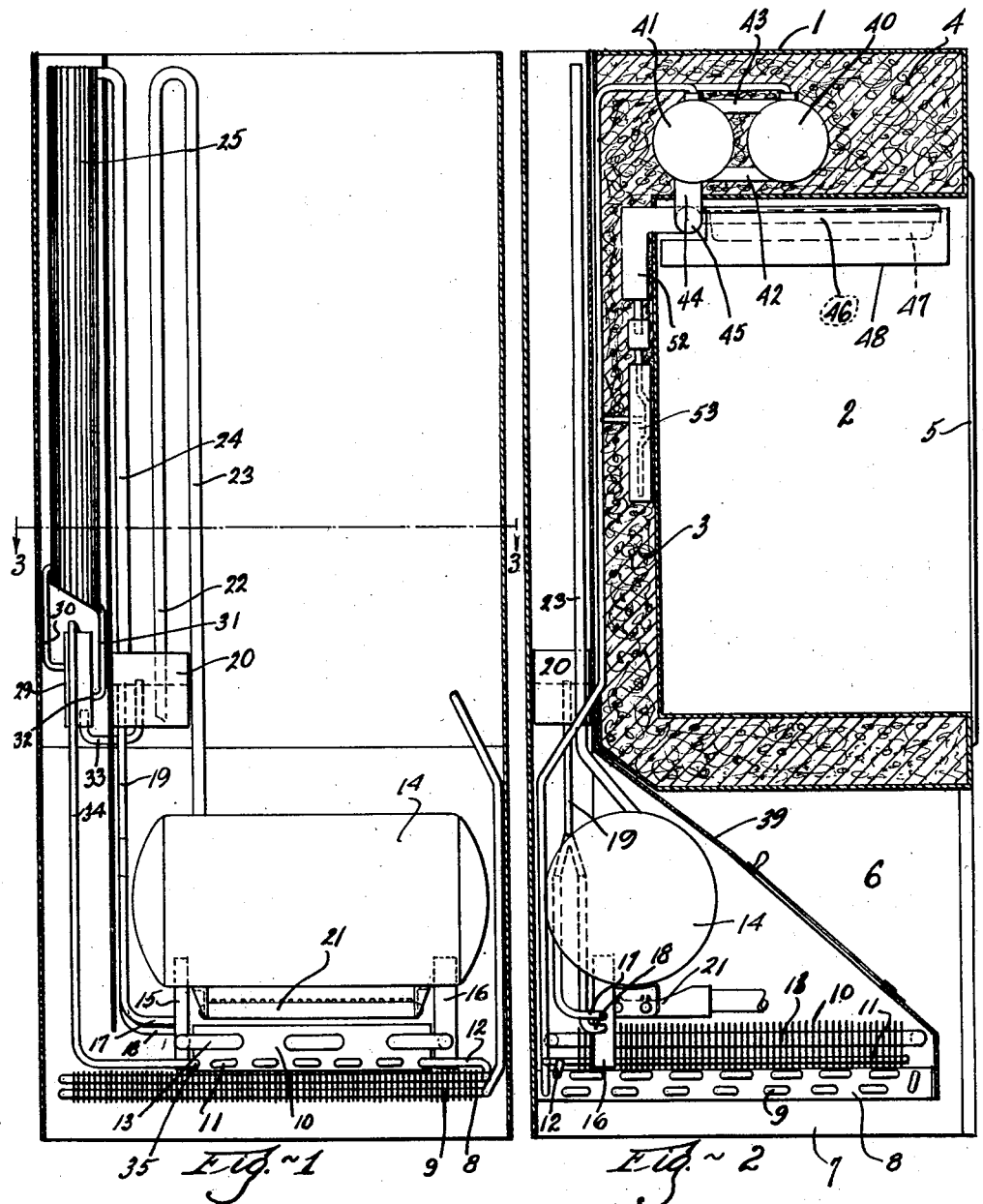

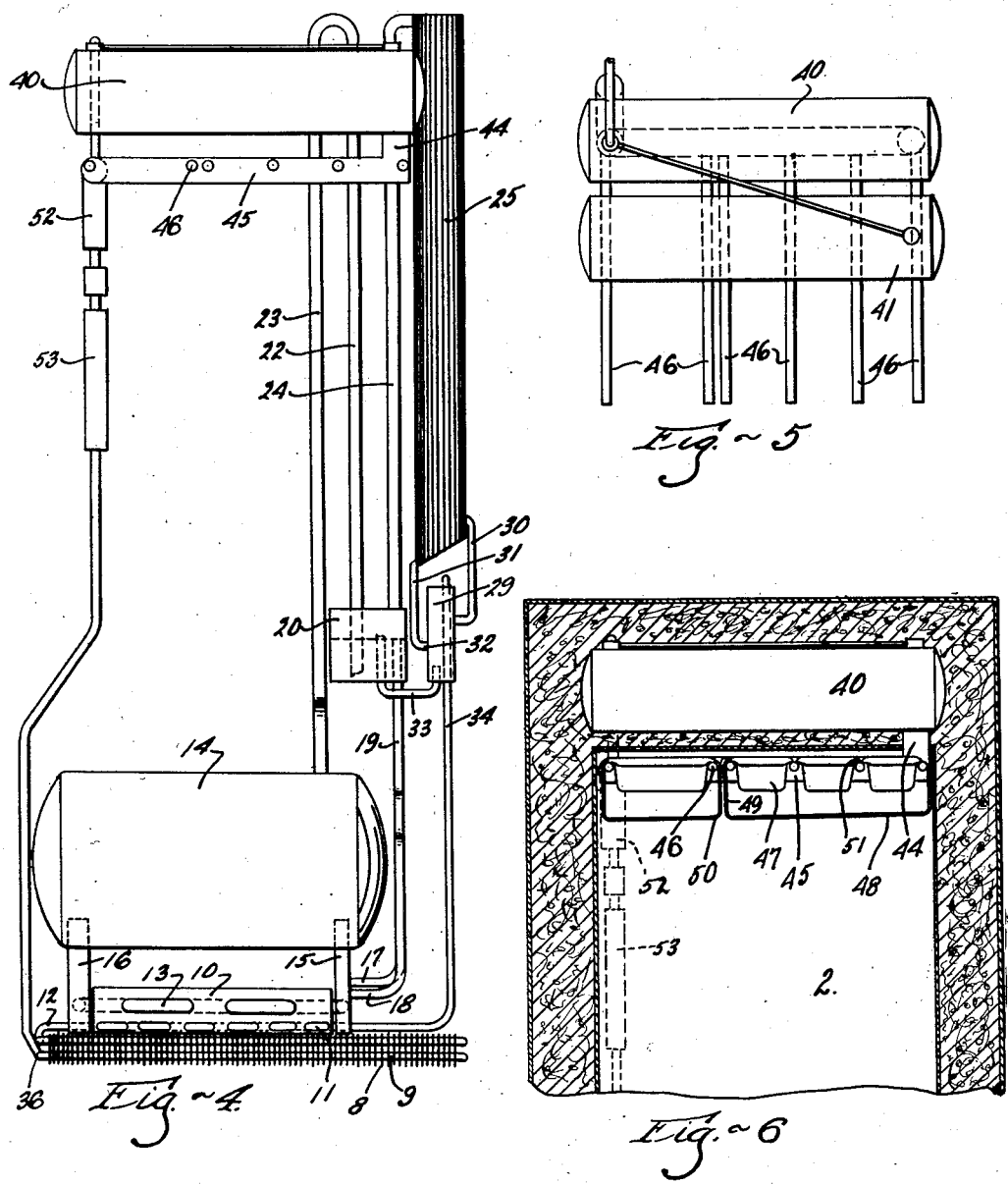

1,898,706

UNITED STATES PATENT OFFICE

EDMUND E. ALLYNE, OF CLEVELAND HEIGHTS, OHIO

REFRIGERATING APPARATUS

Application filed August 16, 1930. Serial No. 475,666.

The invention disclosed in this application relates to refrigerating apparatus, and particularly to such apparatus of the absorption type.

In absorption refrigerating systems and apparatus it is very essential that the refrigerant, no matter how it is circuited from the still through the condenser and to the evaporator on the heating cycle, be returned to the bottom of the still so that it may percolate through the absorbing agent during the cooling or refrigerating cycle. Such a result is usually obtained by the use of a trap forming a seal. Obviously these traps become very hot during the heating cycle and upon the cessation of this cycle and the start of the refrigerating cycle there is apt to be an amount of refrigerant, usually very small, which when it is discharged into the hot trap rapidly expands and tends to blow the trap and interfere with the proper operation of the apparatus. This is particularly true where the trap is of the liquid seal type. Such a blowing of the trap leads a large quantity of gaseous refrigerant to the top of the still where it satisfies the reduction in pressure caused by the cooling of the still and hence stops rapid absorption and refrigeration until this charge of gaseous refrigerant is absorbed through the surface of the liquid, a process which is very slow and undesirable. It is important therefore, as above suggested, that any liquid refrigerant returning, especially at the beginning of the refrigerating cycle, be delivered to a part of the apparatus which is at as low a temperature as possible and not at the temperature of the trap which establishes the return of the gas to the bottom of the boiler. Such an instrumentality should hold such liquid refrigerant and permit it to slowly expand and return through the proper course to the bottom of the still where it may percolate up through the absorbent so that it will be entirely absorbed and will not reach the surface of the liquor in the still in any considerable volume.

With the foregoing in mind, the present invention relates to a method and apparatus for receiving and collecting any globules of returning liquid refrigerant and holding the same at as low a temperature as possible until it gasifies and returns through the proper course without being admitted directly to the trap which establishes the return of the refrigerant to the still during the cooling cycle. Specifically it is in the form of a second trap arranged in a separate flue with the rectifier and kept at as low a temperature as possible so that when any globules of liquid refrigerant move toward the still they enter this second trap, are held there, and are expanded and returned to the first trap where they pass down to the bottom of the boiler and are absorbed in the proper way. The so-called second trap is really not a trap in the sense that it forms a seal for changing the circuiting of the gaseous refrigerant but it merely acts as a holding means to permit expansion and dissipation of the globules of returning liquid refrigerant.

The various features of invention are very aptly set forth in the following description, drawings and claims.

Referring to the drawings, Fig. 1 is a rear elevation of a refrigerator showing the various flues and circuits with the back cover removed; Fig. 2 is a vertical section from front to rear; Fig. 3 is a section upon the line 3—3 of Fig. 1; Fig. 4 is an elevation of the entire refrigerating unit removed from the refrigerator or cabinet; Fig. 5 is a top plan view of the evaporator; and Fig. 6 is a transverse vertical section through the box showing the arrangement of the refrigerating grid and ice cube pan, as well as other features.

In the embodiment shown 1 represents the outer refrigerator or cabinet casing of the general refrigerator type having an inner refrigerating chamber 2 spaced therefrom to provide for insulation 3. As is customary this insulation extends around the refrigerating chamber on the bottom, the back, sides and top; the upper chamber and insulation being of greater vertical depth to provide for a storage chamber, which is indicated at 4, for the reception of the storage, as will appear. The front of the box is of course closed by the door 5. The casing is extended down on the sides below the refrigerator chamber and to the rear with respect to the refrigerating chamber to provide for support on the one hand and flue space at the rear of the box on the other. The casing below provides a generator compartment 6 at the bottom. The bottom of the box is open at 7 for the purpose of permitting free ingress of air into the casing at this point to provide a cooling medium for the air cooled refrigerating mechanism.

Secured in the bottom of the casing and just above the lower edge is the main condenser comprising a multiplicity of copper or other fins each receiving a condenser coil 9 threaded in the usual loop form through these fins 8. All of the coils of this condenser are in series.

Suitably supported above this main condenser is a combined primary condenser and loop unit made up of a multiplicity of fins 10 arranged side by side in spaced relation and having threaded through them a primary condenser element made up of a series of coil units 11 extending in series through these fins and connected by a short pipe 12 to the uppermost end of the coil of the main condenser. Immediately above this primary condenser and in the same fins 10 is a loop coil unit 13 also including a series of return bends connected in series. Arranged above this combined primary condenser and loop unit is a suitable still including a boiler 14 having extending into the same, at the bottom and ends, two vertical loop tubes 15 and 16. These two tubes are connected to the two ends of the loop grid or coil 13. As stated, they are vertical tubes open for communication with the boiler and closed at their lower end. At their lower ends they extend below their connections to the loop coil to provide sediment traps. One of these loop tubes, to wit, 15, receives two smaller tubes 17 and 18, which communicate with this tube 15; the orifice of communication between the tube 17 and the tube 15 being smaller than that of the other tube 18 with the tube 15. These two tubes 17 and 18 join in a gas return tube 19 extending up to the desired liquid level in the liquid seal casing 20.

The boiler is provided with any suitable heating means, such as a burner 21. The liquid seal casing 20 is arranged above the boiler, as shown in Fig. 1, and is of a closed chamber type except for the pipes which enter it. Entering this liquid seal casing and extending to a point near the bottom thereof is a down leg 22 of the gas supply pipe 23 which extends down to the top of the boiler as shown. Extending from the top of this liquid seal casing 20 is the gas outlet pipe 24 rising to a point near the top of the box where it is connected to the main rectifier unit including an outer casing 25. Arranged inside of this rectifier outer casing 25 is an inner tube 26 which forms a long, vertical, annular rectifying chamber within this rectifying unit. This chamber is closed at the top and at the bottom; the bore of the tube 26 however being open at the top and bottom to permit the passage of cooling air up through the same for its cooling effect upon the gas passing through the rectifier. The outer casing 25 may be provided with vertical fins 28 to furnish additional air cooling means for the rectifier. As stated heretofore, the gas outlet pipe 24 enters the annular chamber 27 of the rectifier and passes down through this annular chamber. Below this rectifier is an analyzer trap or secondary seal and it comprises a closed casing 29 of trap or seal form with its bottom substantially on a line with the bottom of the liquid seal casing 20 and extending slightly above the same. This analyzer trap is connected to the rectifier casing 25 at a point slightly above the bottom thereof and enters the analyzer casing at a point above the liquid level in the liquid seal or trap casing 20, as shown in Fig. 1. The extreme lower end of the rectifier casing 25 is connected by another pipe 31 with the analyzer trap casing 29, at a point 32, just below the surface of the level of the liquid in the main liquid seal or trap casing 20. Another trap pipe or U-shaped connection 33 extends up above the bottom of the analyzer trap casing 29 and up through the bottom of the liquid seal casing 20 to a point slightly above the liquid level therein. The condenser pipe 34 leads out of the top of this analyzer casing 29 and is connected, as at 35, with the uppermost end of the primary condenser unit so that the outgoing gas, during the heating period, passes from the boiler through the pipe 23 at the top of the refrigerator in the form of a loop down through the pipe 22 below the level of the liquid in the liquid seal casing 20, bubbles up through this liquid and passes up through the rectifier pipe 24 where it enters the top of the rectifier chamber 27 and passes down and through the pipe 30 into the analyzer seal or trap casing 29 above the liquid therein and thence out through the pipe 34 to the upper part of the primary condenser from whence it flows downward to the bottom or outlet of the condenser, indicated at 36. Any boiler liquor collected from the gas during rectification passes down through the pipe 31 under the surface of the liquid in the analyzer casing and through the pipe 33 to the upper surface of the liquid in the main seal casing 20, where, upon accumulation, it finds its way back to the bottom of the boiler through the loop pipe 19, the two pipes 17 and 18, the vertical loop tube 15 and to the boiler.

In order to insure the proper cooling of the rectifier and secondary trap and to prevent the effect of the heat supplied to the boiler upon them during heating, the rear recess formed by the extension of the sides is divided into flues, one main flue including the right side as shown in Fig. 1, and a partition 37 which separates the back shallow compartment into a right main flue leading to the lower compartment 6, and a left smaller flue indicated at 38 for the rectifier unit; the loop, including the pipes 22, 23 and 24, together with the main liquid seal being retained in the main flue so as to be affected by the heat from the boiler. This partition 37 extends down to a point below the boiler and just above the main condenser structure so that no heat from the boiler can pass up through the small flue 38 and affect the rectifier. From the foregoing it will be seen that the boiler and the main parts of the apparatus which should be retained in a heated condition during the heating period are in the main part of the chamber 6 and communicate with the main flue, whereas the rectifier and the condenser pipe are all in the small flue 38, protected against the heat during the heating period. A suitably inclined casing or plate member 39 extends from a point at the front of the condenser back to the flue to direct the heat from the bottom of the refrigerating chamber to this flue arrangement just described.

Arranged in the storage compartment 4 at the top, and in the top of the box is a storage and evaporator unit. It comprises a pair of storage tanks 40 and 41 arranged horizontally side by side and extending transversely of the box. They are connected at the bottom by two pipes 42 arranged near their ends and at the center and top by a single pipe 43 so that they constitute substantially one tank. Connected to the bottom of the tank 41 is an L-shaped manifold extending downward by a portion 44 into the refrigerating chamber 2 and there connected to a single longitudinal manifold 45. This manifold is provided with a plurality of forwardly extending arms 46 which constitute the evaporator element. These arms are spaced apart and form the supporting means for the cube pans 47. They may be arranged in any suitable manner to take any desired arrangement or size of pans. They also serve to support the ice cube compartment casing, comprising a pan 48 having upwardly extending sides 49 and turned-over edges 50 extending up over the arms as shown. The edges 51 of the ice cube pans also engage in like manner up over the arms 46 and are supported in this way. The manifold 45 is connected by a rearwardly extending angle portion 52 to a suck-back trap arrangement 53.

Having described my invention, I claim:

1. Refrigerating apparatus of the absorption type comprising a still-absorber, a condenser, an evaporator in communication with the low point of the condenser, a liquid seal trap, a riser loop connected to the still-absorber and leading below the surface of the liquid trap for the refrigerant gas as it leaves the still-absorber, a return connection from the trap to the bottom of the boiler for the gas returning during absorption, a second trap, means for cooling the second trap, as gas connection between the gas space in said first trap and the gas space in said second trap, a liquid connection between the lower portion of the second trap and the gas space of the liquid in the first trap whereby gaseous liquid in the second trap will drain into the first and thence to the still, and a connection between the gas space in the second trap and the top of the condenser.

2. Refrigerating apparatus as in claim 1 wherein the gas connection between the first trap and the second trap includes a rectifier.

3. Refrigerating apparatus as in claim 1 wherein the gas connection between the first trap and the second trap includes a rectifier, and a connection between the bottom of the rectifier and gas space to the second trap.

4. Refrigerating apparatus as in claim 1 wherein the gas connection between the first trap and the second trap includes a rectifier, and an additional drainage connection between a low point of the rectifier and the liquid portion of said second trap.

5. Refrigerating apparatus comprising a still-absorber, an evaporator, and condenser connected in operative cycle, a return loop in circulatory communication with the still-absorber, means for directing the returning gas during the refrigerating cycle to the loop and comprising a pipe having a plurality of parts entering the loop at different levels.

6. Refrigerating apparatus comprising a still-absorber, an evaporator, and condenser connected in operative cycle, a return loop in circulatory communication with the still-absorber, means for directing the returning gas during the refrigerating cycle to the loop and comprising a pipe having a plurality of parts entering the loop at different levels with the pipe at the higher level having a smaller orifice of communication than the lower pipe.

7. Refrigerating apparatus comprising a casing having a refrigerating compartment, a still compartment open to the atmosphere at the bottom, a main flue leading from said still compartment, an auxiliary flue out of draft communication with the still compartment and communicating with the opening at the bottom of the casing, and refrigerating apparatus of the absorption type including an evaporator in the refrigerating chamber, a still-absorber in the still-absorber chamber, a condenser adjacent the open bottom of the casing, a rectifier in the auxiliary flue, and suitable connections for connecting the several parts in operative cycle.

8. Refrigerating apparatus of the absorption type including a still-absorber, condenser, evaporator, a liquid seal trap for changing the flow of the gaseous refrigerant in the heating and refrigerating cycles, and means for dissipating any globules of liquid refrigerant returning to the trap during the refrigerating cycle, and comprising a receiving chamber in liquid and gaseous communication with the trap for collecting said liquid refrigerant and holding the same therein for dissipation by expansion prior to delivery to the trap.

In testimony whereof I hereby affix my signature.

EDMUND E. ALLYNE.